United States Patent [19]

Keehan

[11] Patent Number: 5,658,996
[45] Date of Patent: Aug. 19, 1997

[54] MULTI-FUNCTIONAL OXIRANE POLYMERS

[76] Inventor: Donald J. Keehan, 31012 Huntington Woods, Bay Village, Ohio 44140

[21] Appl. No.: 603,746

[22] Filed: Feb. 20, 1996

[51] Int. Cl.$^6$ ............................ C08G 59/40; C08G 65/00
[52] U.S. Cl. ........................ 525/523; 528/94; 528/98; 528/106; 528/395
[58] Field of Search .................... 528/98, 106, 94, 528/395; 525/523

[56] References Cited

U.S. PATENT DOCUMENTS

| | | | |
|---|---|---|---|
| 3,370,038 | 2/1968 | Barton et al. | 528/98 |
| 4,764,580 | 8/1988 | Martin et al. | 528/98 |
| 5,026,816 | 6/1991 | Keehan | 528/94 |

*Primary Examiner*—Frederick Krass
*Attorney, Agent, or Firm*—Fay, Sharpe, Beall, Fagan, Minnich & McKee

[57] ABSTRACT

The present invention relates to a novel oxirane pre-polymer comprised of the catalyzed or uncatalyzed reaction product of tris or tetraphenyl intermediates with a difunctional oxirane oligomer having at least one aromatic moiety and at least one aliphatic moiety, characterized in that substantially hydrolyzable oxygen atoms in said phenyl are bonded to said oligomers, and there is substantially no bonding between oligomer moieties. In a particularly preferred embodiment the present invention relates to a novel oxirane prepolymer comprising the reaction product of a phenyl intermediate with an inorganic oxide having at least one hydrolyzable oxygen and a difunctional oxirane oligomer aliphatic moiety characterized in that a majority of all hydrolyzable oxygen atoms in said oxide are bonded to at least one of the phenyl groups of the tris-phenyl and one phenyl group of the tris-phenyl group is bonded to said oligomer and there is substantially no bonding between oligomer moieties. The present invention also relates to a novel pre-polymer, said pre-polymer comprising of three aromatic groups cross-linked through a carbon ethane group, said aromatic groups having three hydroxyl groups, the prepolymer moiety being the reaction product of one hydroxyl group with one oxirane group of a difunctional oxirane oligomer having at least one aromatic moiety and at least one oxirane aliphatic moiety.

27 Claims, 3 Drawing Sheets

Figure 1            Reaction Without Catalyst

DIGLYCIDYL ETHER OF RESORCINOL [DGER]    1,1,1-TRIS(P-HYDROXY-PHENYL)ETHANE [THPE]

For Future Polymerizations

For Future Polymerizations

Structure is Three-Dimensional With
Multifunctional Oxirane Endcaps

MULTI-FUNCTIONAL OXIRANE POLYMERS

BACKGROUND OF THE INVENTION

This invention relates to novel polymers and more particularly to high performance polymers provided by a cross-reaction involving an organic oligomer, particularly oxirane oligomers.

The formation of tri and tetra functional oxirane polymers such as polyglycidyl ether of phenolformaldahyde novolac, glycidoxy tetraphenylethane, and tris (hydroxyphenyl) methane triglycidal ether are well known but have processing problems in that when these epoxies are homopolymerized, they form brittle structures. Since homopolymerization gives the best temperature and chemical resistance from these tris and tetra epoxies, brittleness becomes its biggest detractor. A further drawback of these epoxies is that they are high melting point solids.

The advantage of the present invention is that high molecular weight polymers can be made from lower molecular weight oxirane oligomers giving the new polymers high aromatic groups for chemical and temperature resistance and high ether groups for elongation and toughness.

Previously, work has been conducted with respect to increasing the molecular weight of oxirane polymers by their catalyzed reaction with dihydric phenols. Epoxy resins cross-linked with dihydric phenol, such as resorcinol, hydroquinone, bisphenol A, etc. are well known. For example, U.S. Pat. No. 3,643,323, herein incorporated by reference, discloses an epoxy resin prepared from a 1, 2 epoxy and a dihydric phenol in the presence of one or more advancement catalysts.

However, increasing the molecular weight of oxirane oligomers with tris-phenyls, such as tris (P hydroxy-phenyl) ethane or tris (4-hydroxyphenyl) 1,3,5-trisispropylbenzene has not been performed. The particularly molecular structures of these presently preferred phenyls include the following. Tris (P-Hydroxy-Phenyl) ethane, a solid at room temperature having the molecular structure:

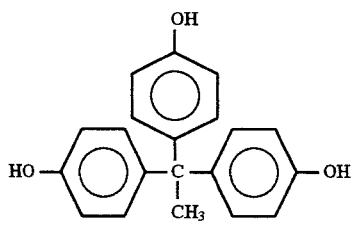

Molecular weight: 306

Melting point: 247.2° C.

Tris (4-Hydroxy-Phenyl) 1, 3, 5-trisispropylbenzene, a solid at room temperature having the molecular structure:

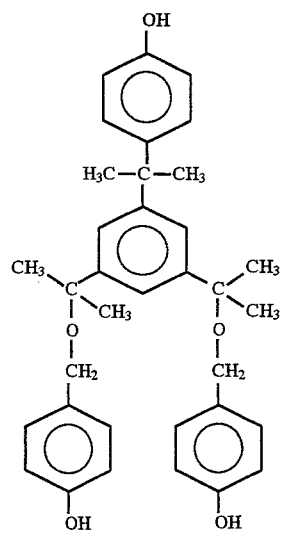

Molecular Weight: 480

Melting point: 189° C.

SUMMARY OF THE INVENTION

This invention relates to novel polymers and more particularly to high performance polymers provided by the cross-reaction of an oxirane oligomer containing more than one oxirane group per molecule with a tris-phenyl such as tris (p-hydroxyphenyl) ethane, tris (p-hydroxyphenyl) methane or tris (4-hydroxyphenyl) 1,3,5-triisopropyl benzene. Furthermore, an advancement catalyst can be utilized at times. This invention also relates to novel polymers provided by crossreaction of an inorganic oxide, the tris functional organic intermediate, and an organic oxirane oligomer.

This cross-linking of the inorganic oxide with the organic tri-phenyl and the organic oxirane oligomer, through partial polymerization adds the beneficial properties of an inorganic oxide with multi-aromatic groups, while maintaining a low viscosity prepolymer capable of being fully polymerized at a later date.

In one aspect, the present invention relates to a novel prepolymer comprising the catalyzed and uncatalyzed reaction product of a tris-phenyl intermediate having at least one hydrolyzable oxygen with a difunctional oxirane oligomer, having at least one aromatic moiety and at least one oxirane containing aliphatic moiety, and optionally an inorganic oxide, characterized in that substantially all of the hydrolyzable oxygen atoms in said tris-phenyl intermediate are bonded to said oligomer and/or said inorganic oxide and there is substantially no bonding between oligomer moieties.

In another aspect, the present invention relates to a novel tris-phenyl intermediate polymer, said polymer comprising at least three cross-linked pre-polymer moieties, each of the pre-polymer moieties being the reaction product of a tris-phenyl intermediate having at least one hydrolyzable oxygen with a difunctional oxirane oligomer having at least one aromatic moiety and at least one oxirane containing aliphatic moiety.

In still another aspect of the invention, a process is provided for preparing pre-polymers which comprises reacting a tris-phenyl intermediate containing at least one hydrolyzable oxygen with an oxirane oligomer having at least one aromatic moiety and at least one oxirane containing aliphatic moiety and the process is conducted in the presence of an inorganic oxide. Optionally, in the presence of a quantity of catalyst sufficient to effect reaction of substantially all of the hydrolyzable oxygen atoms in the phenyl intermediate with the oligomer while effecting substantially no cross-linking of phenyl-oligomer moieties.

The polymer can be used in advanced composites, protective coatings, adhesives, castings, electrical potting compounds and the like.

DETAILED DESCRIPTION OF THE INVENTION

Figure 1:
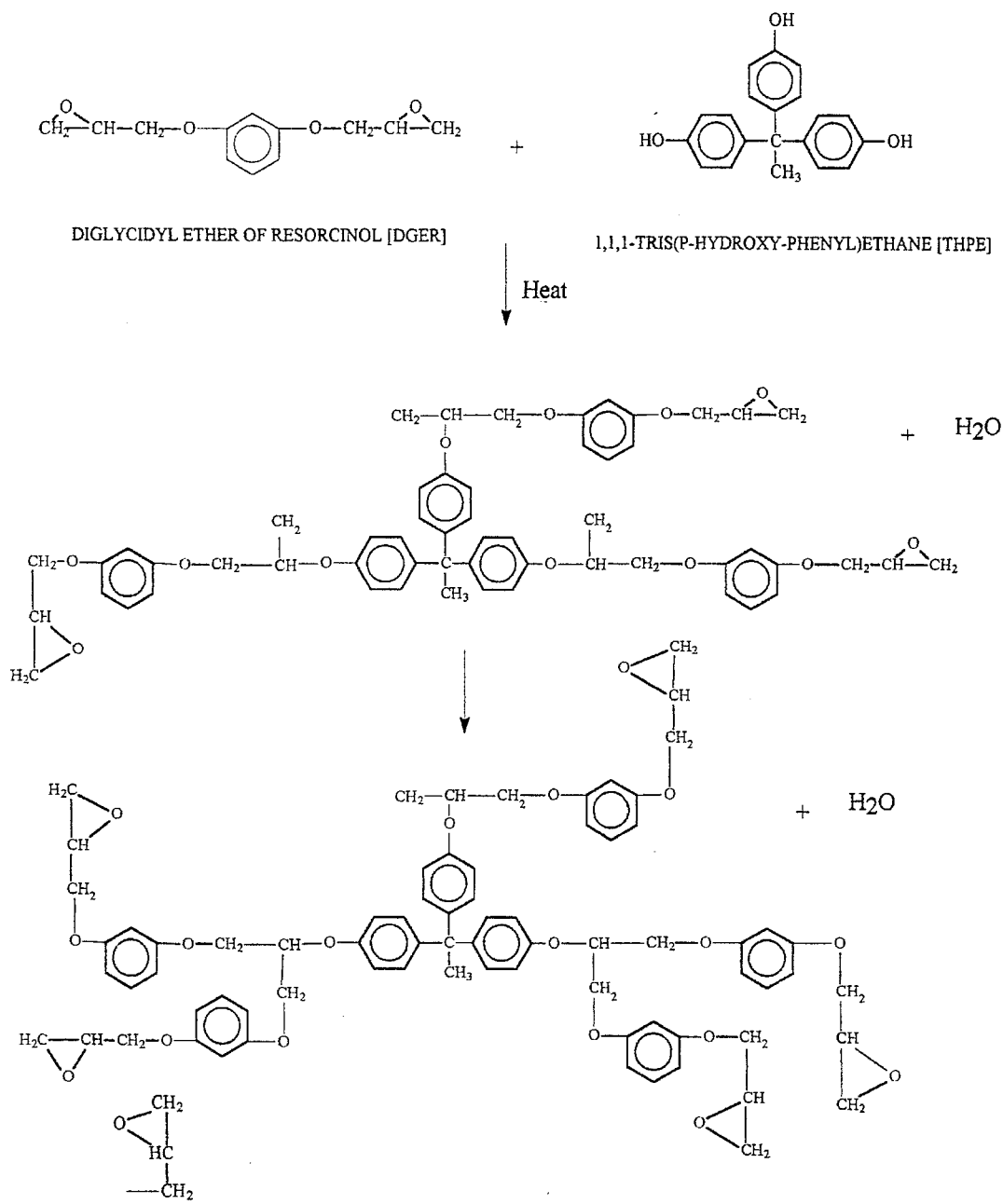
FIG. 1 depicts the expected uncatalyzed reaction producing the inventive polymer.

The novel polymers of the present invention are prepared by chemically bonding a tris-phenyl intermediate having a hydrolyzable oxygen, such as Tris (P-Hydroxyphenyl) Ethane, Tris-(P-Hydroxyphenyl) Methane, Tris (4-Hydroxyphenyl) 1, 3, 5-Triisopropylbenzene or the like with a difunctional oxirane oligomer, such as N,N-Diglycidyl Aniline (DGA) or the diglycidyl ether of Resorcinol (DGER) or the Diglycidyl Ether of Bisphenol F (DGEBF); causing only partial reaction of the oligomer with the hydroxyl groups of the trisphenyl intermediate to form a tetrafunctional, pentafunctional and above prepolymer. These prepolymers can be further reacted and polymerized with tertiary, secondary or primary amines, anhydrides, Lewis acids, Lewis bases, amides, ureas, melamines, and other commonly used hardeners and catalysts.

By forming the pre-polymers, and reacting all the tris-phenyl functional groups with a portion of the oxirane groups, prior to final polymerization, it is possible to obtain enhanced properties in the final polymer such as heat deflection temperature, chemical resistance, toughness, tensile-flexural strengths, as compared to polymers formed by mere physical blending and direct polymerizing of the same oligomers, polyhydric phenols, catalyst, hardener or initiator. The prepolymer is a liquid at or slightly above room temperature, with all hydrolyzable sites reacted irreversibly, eliminating further hydrolysis and chemical reaction. A further advantage when using DGER is that, after cross linking with the tris-phenyl, the problem of dermatitis in handling is reduced or eliminated.

The low viscosity of the prepolymers allows for sprayable coatings without having to use solvents, prepregging fibers, such as carbon, graphite, ceramic, glass, silicon carbide, etc., encapsulation of electronic equipment, reaction injection molding, filament winding and many other functions requiring or facilitated by low viscosity. These multi-functional prepolymers can be cured immediately, or at a future date, using any suitable epoxy catalyst and hardeners include primary and secondary amines, tertiary amines, anhydrides, imidazoles, amides and the like.

While not willing to be bound by any specific theory or theories which might explain the unexpected improvements achieved using the techniques and materials of the present invention, the following discussion relates to some possible explanations.

By incorporating tris-phenyl intermediate (THPE) in a medium such as, diglycidyl ether of resorcinol (DGER), there are far more reactive groups in the polymer DGER than are available in the THPE constituent. Once reaction is initiated, all available reactive groups on the THPE are reacted, but by minimizing the amount of catalyst or eliminating it all together, full polymerization of the prepolymer is prevented. The catalyst only initiates the reaction between the hydroxyl or reactive sites of the THPE and a portion of the oxirane groups, leaving other oxirane groups available for further polymerization. This results in a large aromatic backbone with ether linkage to the prepolymer.

It would further appear that reactivity is satisfied by minimum catalyst reacting all available hydroxyl groups, with a limited amount of oxirane groups. The resultant stearic hindrance prevents any further, polymerization of the prepolymer, additional catalyst or hardener is added to effect three dimensional cross linking and full polymerization.

Physical evidence of formation of the tris-phenyl THPE/DGER prepolymer is provided by the formation of a clear slightly yellow liquid which is smooth and uniform with no sedimentation. The weight per epoxide increases from 125 for the DGER to 196 for the prepolymer. The THPE/DGER prepolymer has a viscosity of 13,400 cps at 24° C. verses 300 to 500 cps for DGER. The addition of a catalyst causes a further crosslinking at lower temperatures producing a prepolymer of THPE/DGER with an epoxide weight of 320 and an increase in viscosity to 56,000 cps.

Chemical evidence of formation of the THPE/DGER prepolymer is seen in the massive improvement of its glass transition temperature and physical properties. One thousand (1000) grams of the THPE/DGER prepolymer of example 1 hereinafter were mixed with 30 grams of an imidazole and cured 2 hours at 93° C. plus 4 hours at 150° C. One thousand (1000) grams of diglycidyl ether of resorcinol (DGER) were mixed with 30 grams of an imidazole and cured 2 hours at 93° C. plus 4 hours at 150° C. Comparison of physical properties are as follows:

|  | DGER | THPE/DGER |
| --- | --- | --- |
| Tensile Strength | 9,800 psi | 13,100 psi |
| Compression Strength | 29,500 psi | 29,100 psi |
| Flexural Strength | 13,000 psi | 23,500 psi |
| Elongation - % | 1.8% | 9.8% |
| Weight per Epoxide | 125 | 196 |
| Glass Transition Temperature (Tg) | 140° C. | 386° C. |

Figure 2:
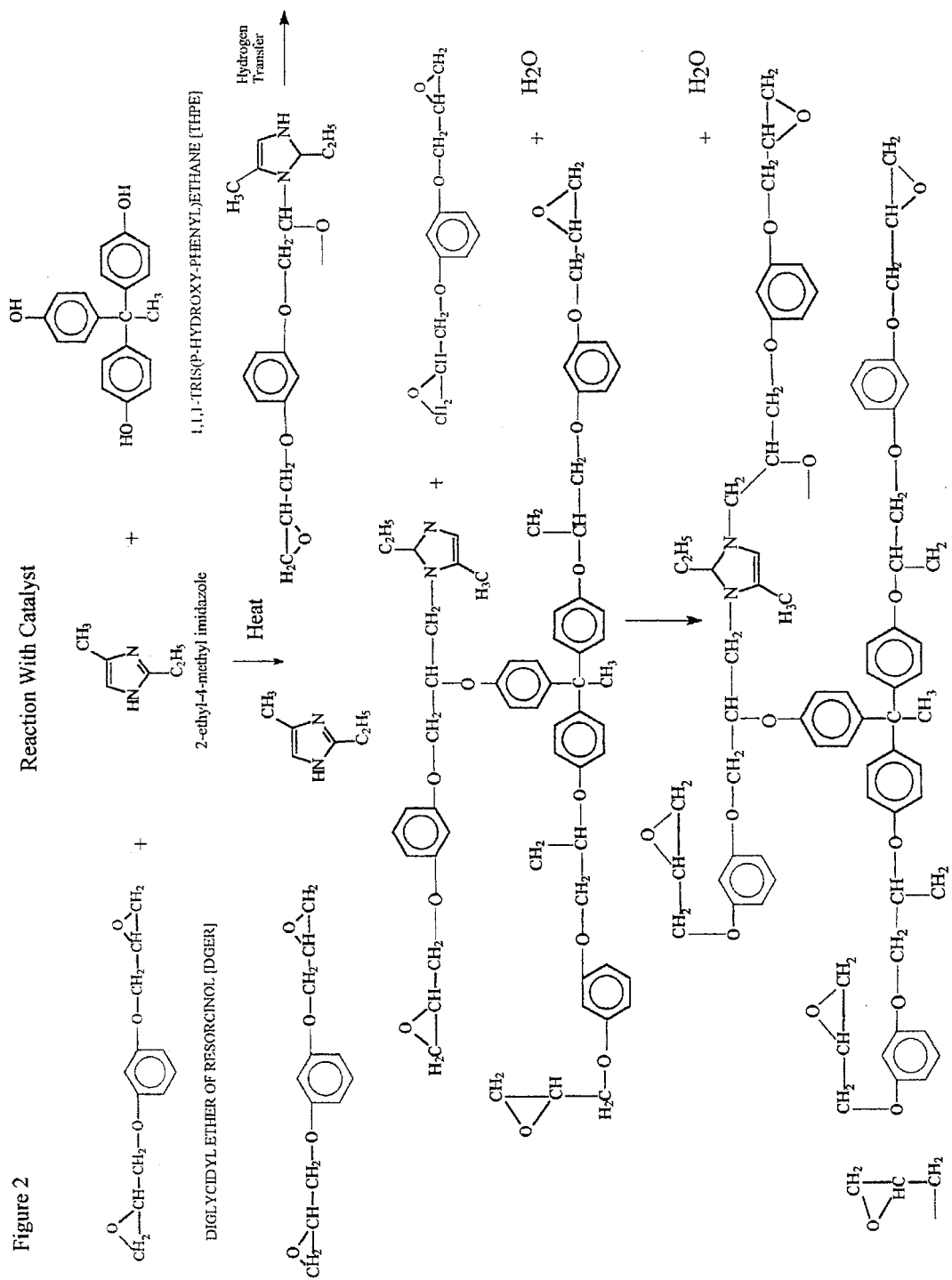
FIG. 2 depicts the expected catalyzed reaction producing the inventive polymer.
Figure 3:
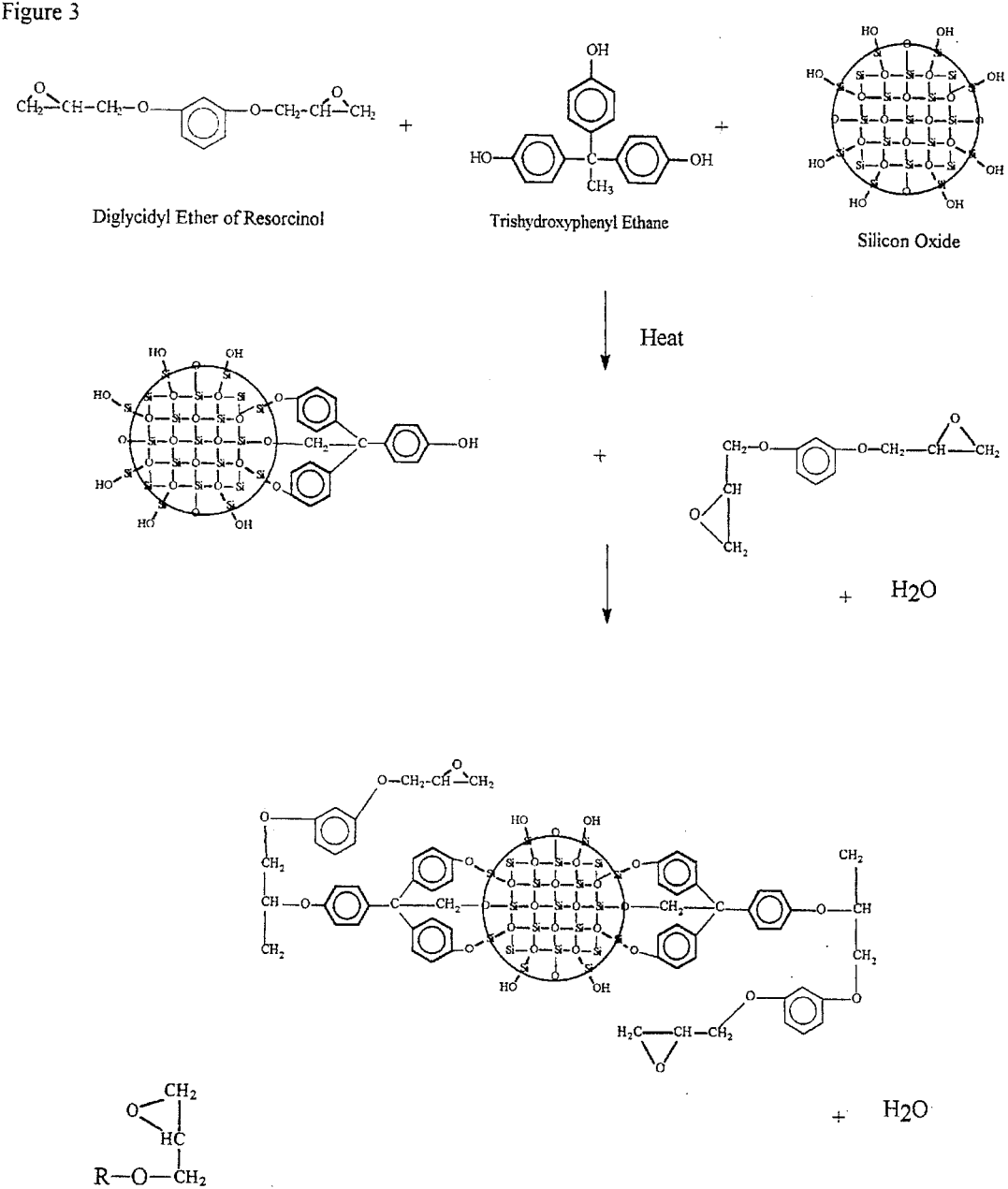
FIG. 3 depicts the expected process for producing the inventive polymer including an inorganic oxide.

The equations of FIGS. 1 and 2 set forth, by way of illustration and not by way of limitation, the sequence of the principal reactions which are thought to be involved.

In general, the preferred oxirane oligomers of the present invention are dimers, trimers or tetramers, composed of at least one aromatic moiety and at least one aliphatic moiety having an oxirane group, and having an epoxide equivalent in the range of from about 120 to about 200. Suitable oligomers on the other hand may have an epoxide equivalent in the range of from about 100 to about 3000.

The present invention has identified the following epoxy resins of oxirane oligomers as particularly suitable.

A preferred oxirane oligomer is diglycidyl ether of resorcinol (DGER), i.e., 1, 3bis-(2-3 epoxy-propoxy) benzene, which has the following structure:

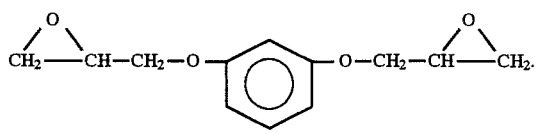

Diglycidyl Ether of Resorcinol has an epoxide equivalent of between 120 and 135 and a viscosity at 25° C. of between 300 and 500 CPS. The small molecular size leads to the low epoxide equivalent and indicates that the molecule can achieve a high final cross-link density.

Another suitable oxirane oligomer is N,N diglycidyl aniline having an epoxide equivalent between 105 and 115 and a viscosity at 25° C. between 110 and 135 CPS. This compound has the structure:

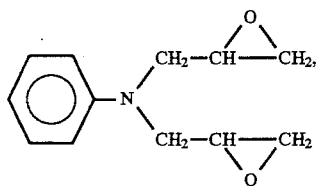

A further suitable oxirane resin is diglycidyl ether of bisphenol "F" having an epoxide equivalent between 155 and 174 and a viscosity at 25° C. between 3000 and 7000 CPS. This compound has the structure:

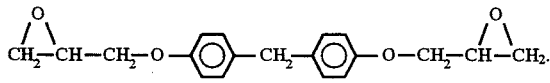

As examples of suitable catalysts, the following specific materials are suggested by way of illustration and not by way of limitation:
imidazole
4-acetaminoimidazole
5-acetaminoimidazole
   1-acetylimidazole
   4-aminomidazole
   5-aminoimidazole
   2-(2-aminoethyl)-imidazole
   5-amino-1-methylimidazole
   1-benzoylimidazole
2-benzylthioimidazole
4,5-bis(p-bromophenyl)-imidazole
   2-chloroimidazole
   4-benzylthio-5-nitroimidazole
   5-benzylthio-4-nitroimidazole
   4-bromoimidazole
   5-bromoimidazole
   2-bromo-4,5-diphenyl-imidazole
   2-butylthio-2-cyclohexyl-4,5-diethylimidazole
   1,5-dimethylimidazole
   1-methylimidazole
   2-methylimidazole
   2-ethyl-4-methylimidazole
   4-methylimidazole
   1-methyl-4-phenylimidazole
1-methyl-4-nitroimidazole
5-nitroimidazole
1-phenylimidazole
2-phenylimidazole
1-methylimidazole
imidazole-4-acetic acid
1-vinyl-2-methylimidazole
imidazole-1-acetic acid
imidazole-1-aniline
5-butyramidoimidazole
4-carboxamidoimidazole
1-carbboxyimidazole
2-carboxyl-1-benzylimidazole
4,5-dicarboxamidoimidazole
4,5-dicarboxyimidazole
imidazole-1-ethanol
2-thioimidazole
2-acetamino-1-benzylbenzimidazole
1-acetylbenzimidazole
2-aminiobenzimidazole
2-(1-aminobutyl)4-amino-6-ethoxybenzimidazole
2-amino-1-ethylbenzimidazole
2-amino-1-methylbenzimidazole
2-benzylaminobenzimidazole
1-benzyl-2-chlorobenzimidazole
2-benzyl-5-nitrobenzimidazole
2-p-bromobenzylbenzimidazole
2-butylthiobenzimidazole
5-chlorobenzimidazole
6-chlorobenzimidazole
6-chloro-1,2-dimethylbenzimidazole
5,6-dichlorobenzimidazole
5,6-dimethylbenzimidazole
5,6-dinitrobenzimidazole
2-ethyl-5-dinitrobenzimidazole
1-methylbenzimidazole
6-methyl-2-phenylbenzimidazole
6-phenylbenzimidazole
2-acetamino-N-methylbenzimidazole
benzimidazole-2-acetic acid
2-carboxamidobenzimidazole
2-carboxy-benzimidazole
2-carboxyl-5-bromobenzimidazole
2,4-dimethylimidazoline
2-methylimidazoline
1-vinyl-2-methylimidazoline
2-ethyl-4-methylimidazoline
2-chloromethyl-2-imidazole
2-methylimidazoline phenate
imidazole lactate
imdazoleacetate
2,4-dihydro-4-phenylpyrimidine
4-methyl-1,4,5,6-tetrahydropyrimidine
3,4-dihydroquinazoline
2-benzyl-2-imidazoline-4-carboxylic acid
2-(1-naphthylmethyl)-2-imidazoline and
2-chloromethyl-2-imidazoline.

The preferred catalysts are those of the imidazole and imidazoline series, and especially imidazole, 1-methylimidazole, 2-methylimidazole, 2-ethyl-4-methylimidazole, 2,4-dimethylimidazole, 2phenylimidazole, 1-vinyl-2-methylimidazole, 2-ethyl-4-methylimidazole and imidazole lactate.

An alternative aspect of the present invention includes multifunctional inorganic oxide in the novel polymer. The polymer comprises at least three cross-linked prepolymer moieties, each moiety being the reaction product of an inorganic oxide having at least one hydrolyzable oxygen with a a tris-phenyl group with a difunctional oxirane oligomer having at least one aromatic moiety and at least one oxirane containing aliphatic moiety.

The preferred inorganic oxides have an average particle size of 4 microns or less selected from the group consisting of Silicon Oxide, Aluminum Oxide, Magnesium Oxide and Titanium Dioxide. This aspect of the invention is fully described in U.S. Pat. No. 5,026,816, herein incorporated, by reference.

The novel polymers of this embodiment are prepared by chemically bonding an inorganic oxide having hydrolyzable oxygen, such as silicon oxide, aluminum oxide, magnesium oxide, or the alike with the tris-phenyl or tetra-phenyl such as tris (P-hydroxyphenyl) ethane, tris (P-hydroxyphenyl) methane, tris (4-hydroxyphenyl) 1,3,5-triisopropyl Benzene with a difunctional oxirane oligomer such as diglycidyl ether of resorcinol (DGER), diglycidyl ether of bisphenol A, diglycidyl ether of bisphenol F, N,N-diglycidyl aniline allowing only partial reaction of the -phenyl with the hydroxyl groups of the inorganic oxide and additional reaction of the phenyl with the oxirane oligomer, to form an organic aromatic-inorganic backbone with oxirane end caps. These prepolymers can be further reacted and polymerized with tertiary, secondary or primary amines, anhydrides, lewis acids, lewis bases, amides, ureas, melamines, triazines and other commonly used hardeners and catalysts.

By forming the prepolymers and reacting most of the inorganic functional groups with a large portion of the phenyl groups and end capping with an oxirane group, prior to final polymerization, it is possible to obtain enhanced properties in the final polymer such as glass transition temperatures, tensile and flexural strengths, as compared to standard multi-functional oxirane polymers. Also the prepolymer is a low viscosity liquid verses a high melting temperature solid of the standard multi-functional oxirane polymers.

The low viscosity of the prepolymers allows for prepregging fibers, such as carbon, graphite, ceramic, glass, etc., encapsulation of electronic equipment, reaction injection molding, filament winding, sprayable coatings, all without the addition of solvents. These organic-inorganic prepolymers can be cured (fully polymerized) immediately, or at a future date.

Each prepolymer using a different inorganic oxide delivers properties that are uniquely distinct from one another, e.g., fused silica provides a low coefficient of thermal expansion, aluminum oxide results in excellent abrasion resistance and flame retardancy, and magnesium oxide gives a high coefficient of thermal conductivity.

Physical evidence of the formation of the phenyl-inorganic oxide-oxirane oligomer is quite convincing. The product is smooth, opaque and uniform with no sedimentation. When reacting tris-phenyl THPE with silicon oxide and the oxirane oligomer DGER the weight per epoxide for the DGER has increased from 125 to 175 but the viscosity has only increased from 300 to 500 cps to 2600 cps at 24° C. This is compared to the uncatalized (Example 1A) THPE/DGER prepolymer (no inorganic oxide) of 196 weight per epoxide and a viscosity of 13,400 cps at 24° C.

Further evidence of the formation of organic-inorganic prepolymer is in the massive improvement of its glass transition temperature as expressed in the following table (all polymers were mixed with 3 phr of an imidazole and cured for 2 hours at 93° C. plus 4 hours at 150° C.):

|  | DGER | THPE/DGER | Organic-Inorganic Prepolymer |
|---|---|---|---|
| Glass Transition Temperature (Tg) | 140° C. | 386° C. | 417° C. |
| Weight Per Epoxide | 125 | 196 | 175 |
| Viscosity | 300–500 cps | 13,400 cps | 2,600 cps |

While not willing to be bound by any specific theory or theories which might explain the unexpected improvements achieved using the techniques and materials of the present invention, the following discussion relates to some possible explanations.

By reacting tris-phenyl intermediate (THPE) with an inorganic oxide (SiO) in an oxirane oligomer (DGER) at a specified temperature the THPE becomes liquid and reacts with a portion of the silanol (SiOH hydroxyl) groups of inorganic oxide and an oxirane group of the DGER. Once reaction is initiated, all available reactive groups on the THPE are reacted, but by minimizing the temperature and time of reaction full polymerization of the prepolymer is prevented. This condensation reaction only initiates the reaction between the hydroxyl (SioH) of the silicon oxide and the hydroxyl or reactive sites of the THPE. Due to the molecular length of the THPE and the availability of SiOH groups within that length two (2) of the three (3) phenyl groups react with silanol groups and the third phenyl group reacts with an oxirane group, leaving other oxirane groups available for further polymerization. This results in a silicon oxide particle completely surrounded and bonded to an aromatic group with oxirane end caps.

The resultant stearic hinderance prevents any further polymerization of the prepolymer, additional catalyst or hardener is required to effect three dimensional cross linking and full polymerization.

The equations set forth in FIG. 2, by way of illustration and not by way of limitation, provide the sequence of the principal reactions which are thought to be involved.

A representative process for preparing an uncatalyzed prepolymer according to the present invention is as follows. In the preferred aspect of this invention, tris(p-hydroxyphenyl) ethane in an amount less, than fifty (50) parts to one hundred (100) parts of the oxirane oligomer are heated and partially crosslinked. The THPE can be varied depending on physical properties desired, such as glass transition temperature, viscosity, epoxide equivalent weight, tensile strength, and the like.

Reaction and partial polymerization with bonding of the hydroxyl groups of the tris-phenyl to a portion of the oxirane group, is accomplished by heating the oligomer in a reactor containing a high shear mixer, until the oligomer reaches a predetermined temperature, generally between 60° C. and 90° C. The tris-phenyl is added in and becomes liquid. The reaction and bonding takes place while mixing for a predetermined period of time generally between about one half (e) hour to about two (2) hours, at a temperature range from about 140° C. to 220° C. In addition to causing the reaction at these temperatures, the temperature drives the $H_2O$ from the condensation reaction off as steam. Continuous high shear mixing with a slight vacuum on the reactor facilitates removal of the steam.

Increasing temperature or time above the preferred levels, may cause the polymer to polymerize to an unusable degree or state A preferred process for preparing catalyzed prepolymer is as follows. In the preferred aspect of this invention the catalysts employed are imidazoles, benzimidazoles, dihydropyromidines, tetra hydropyrimidines, dihydroquinazolines and imidazolines which contain from 0–2 substituents and especially from 0–1 substituents. The preferred substituents being lower alkyl, lower alkyl aryl, lower alkenyl, lower alkoxy and especially methyl, ethyl, phenyl and vinyl.

The partial polymerization is carried out using one of the preferred catalyst in an amount less than about one (1) part of catalyst per one hundred (100) parts of the oxirane oligomer. The tris-phenyl in an amount less than fifty (50) parts to one hundred (100) parts of the oxirane oligomer depending on the physical properties desired, such as viscosity, epoxide equivalent weight, glass transition temperature, tensile strength and the like. The catalyst is most preferably used in an amount of between 0.01 and 0.50 parts per hundred (100) parts of oligomer normally used for complete polymerization.

Reaction and partial polymerization with the bonding of the hydroxyl sites of the tris-phenyl to a portion of the oxirane group, is accomplished by heating the oligomer in a reactor containing a high shear mixer, until the oligomer reaches a predetermined temperature, generally between 60° C. and 90° C. The catalyst is added and mixed into the oligomer for a predetermined period of time, generally between about 5 to about 10 minutes. The tris-phenyl is added and becomes liquid. The reaction and bonding takes place while mixing for a predetermined period of time generally between about one half (h) hour to about two (2) hours at a temperature range from 100° C. to 160° C. This heating of the reaction solution is believed to cause the hydroxyl groups of the tris-phenyl to react with a portion of the oxirane groups, giving a partially polymerized prepolymer. The reaction ceases when all the available hydroxyl sites have reacted and heating is discontinued.

Increasing the catalyst, temperature or time above the preferred levels, may cause the polymer to polymerize to an unusable degree or state.

The invention will be better understood by reference to the following examples, which are presented for purpose of illustration only and are not intended to be construed in a limiting sense.

EXAMPLE 1

A) Uncatalyzed Prepolymer 2900 grams of liquid resin, diglycidyl ether of resorcinol was charged to a reactor equipped with a vacuum system and a high shear mixer. The resin was mixed while raising the temperature to 90° C. Upon reaching 90° C., 290 grams of tris(p-hydroxyphenyl) ethane was added to the reactor. The reactants were heated to 175° C., while mixing at 1900 rpm for a period of two (2) hours. When the solution changed color, the heat was removed from the reactor and the product cooled while mixing continued. After thirty (30) minutes the product was discharged from the reactor and recovered.

| Results: | |
|---|---|
| Color | Clear Light Yellow |
| Viscosity @ 24° C. | 13,400 cps |
| Non-Volatile Content | 99.999% |
| Specific Gravity | 1.16 |
| Epoxide Equivalent Weight | 196 |
| % Sedimentation | 0 |

B) Catalyzed Prepolymer 2900 grams of liquid resin, diglycidyl ether of resorcinol, and 2.9 grams of catalyst, 2-ethyl-4methylimidazole were charged to a reactor equipped with a high shear mixer and vacuum system. The reactants were mixed while raising the temperature to 80° C. Upon reaching 80° C., 290 grams of tris(p-hydroxyphenyl) ethane was added to the reactor. The reactants were then heated to 135° C., while mixing at 1900 rpm for a period of one (1) hour. When the solution changed color, the heat was removed from the reactor and the product cooled while mixing continued. After fifteen (15) minutes the product was discharged from the reactor and recovered

| Results: | |
|---|---|
| Color | Clear Reddish Brown |
| Viscosity @ 24° C. | 56,400 cps |
| Non-Volatile Content | 99.999% |
| Specific Gravity | 1.16 |
| Epoxide Equivalent Weight | 320 |
| % Sedimentation | 0 |

EXAMPLE 2

A) Uncatalyzed Prepolymer 2900 grams of liquid resin, diglycidyl ether of resorcinol was charged to a reactor equipped with a vacuum system and a high shear mixer. The resin was mixed while raising the temperature to 90° C. Upon reaching 90° C., 1497 grams of tris(p-hydroxyphenyl) ethane was added to the reactor. The reactants were heated to 175° C., while mixing at 1900 rpm. The solution changed color after thirty five (35) minutes and exothermic reaction increased solution temperature to 260° C., at which time the mixer and all heat were removed from the reactor. Product was cooled directly.

Results:

Exothermic reaction caused the solution to continue to polymerize, until it was an irreversible solid.

B) Catalyzed Prepolymer 2900 grams of liquid resin, diglycidyl ether of resorcinol and 29 grams of catalyst, 2-ethyl-4methylimidazole were charged to a reactor equipped with a high shear mixer and a vacuum system. The reactants were mixed while raising the temperature to 80° C. Upon reaching 80° C., 290 grams of tris(p-hydroxyphenyl) ethane was added to the reactor. The reactants were heated to 135° C., while mixing at 1900 rpm. The solution changed color after 30 (30) minutes and started to increase in viscosity to a point that it stalled the mixer. Heat was removed from the reactor and the product cooled.

Results:

Product continued polymerization until it became a solid rubbery mass.

EXAMPLE 3

(Bis F):

2900 grams of liquid resin, diglycidyl ether of bisphenol F and 290 grams of tris(p-hydroxyphenyl) ethane were charged to a reactor equipped with a high shear mixer and a vacuum system. The reaction was then carried out in the manner set forth in Example 1A (Uncatalyzed Prepolymer) above.

| Results: | |
|---|---|
| Color | Clear Yellowish Liquid |
| Viscosity @ 24° C. | 6,400 cps |

-continued

| Results: | |
|---|---|
| Non-Volatile Cement | 99.999% |
| Specific Gravity | 1.16 |
| Epoxide Equivalent Weight | 386 |
| % Sedimentation | 0 |

EXAMPLE 4

(Diglycidyl Aniline):

2900 grams of liquid resin, diglycidyl aniline and 290 grams of tris-(p-hydroxyphenyl) ethane were charged to a reactor equipped with a high shear mixer and vacuum system. The reaction was then carried out in the manner set forth in Example 1A (Uncatalyzed Prepolymer) above.

| Results: | |
|---|---|
| Color | Clear Light Yellow Liquid |
| Viscosity @ 24° C. | 2,600 cps |
| Non-Volatile Content | 99.999% |
| Specific Gravity | 1.16 |
| Epoxide Equivalent Weight | 190 |
| % Sedimentation | 0 |

EXAMPLE 5

(Tris-isopropylbenzene):

2900 grams of liquid resin, diglycidyl ether of resorcinol and 290 grams of tris(4-hydroxyphenyl) 1,3,5, trisisopropyl benzene were charged to a reactor equipped with a high shear mixer and vacuum system. The reaction was then carried out in the manner set for in Example 1A (Uncatalyzed Prepolymer) above.

| Results: | |
|---|---|
| Color | Clear Yellowish Liquid |
| Viscosity @ 24° C. | 6,400 cps |
| Non-Volatile Content | 99.999% |
| Specific Gravity | 1.16 |
| Epoxide Equivalent Weight | 201 |
| % Sedimentation | 0 |

From the foregoing examples it will be clear that an excess of trisphenyl (Example 2A) or catalyst (Example 2B) provides a fully polymerized mass. The fully polymerized product of Example 2A and 2B had substantially inferior physical properties, in comparison to the Example 1A as described in the earlier table.

It is apparent that there has been provided in accordance with this invention novel polymers and prepolymers, as well as a process for producing such described in combination with the specific materials and embodiments thereof, it is evident that many substitutions, alternative, modifications, and variations will be apparent to those skilled in the art in light of the foregoing description. Accordingly, it is intended to embrace all such substitutions, alternatives, modifications and variations as fall within the spirit and scope of the appended claims.

I claim:

1. A liquid oxirane prepolymer comprising the reaction product of a tris-phenyl having at least one hydrolyzable oxygen with a difunctional oxirane oligomer having at least one aromatic moiety and at least one oxirane containing aliphatic moiety and a metallic oxide having at least one hydrolyzable oxygen, characterized in that substantially all of the hydrolyzable oxygen atoms in said tris-phenyl and said metallic oxide are bonded to said oligomer and there is substantially no bonding between oligomer moieties.

2. The prepolymer according to claim 1 wherein said oligomer is the diglycidyl ether of resorcinol.

3. The prepolymer of claim 1 wherein said oligomer is the diglycidyl ether of bisphenol A.

4. The prepolymer of claim 2 wherein said metallic oxide is silica.

5. The prepolymer of claim 3 wherein said metallic oxide is silica.

6. The prepolymer of claim 2 wherein said metallic oxide is aluminum oxide.

7. The prepolymer of claim 3 wherein said metallic oxide is aluminum oxide.

8. The prepolymer of claim 2 wherein said metallic oxide is magnesium oxide.

9. The prepolymer of claim 3 wherein said metallic oxide is magnesium oxide.

10. The prepolymer of claim 1 wherein said metallic oxide is a member selected from the group consisting of titanium oxide, antimony oxide, zinc oxide, iron oxide and molybdenum oxide.

11. The prepolymer of claim 1 wherein said tris-phenyl is tris(P-hydroxyphenyl) ethane.

12. The prepolymer of claim 1 wherein said tris-phenyl is tris (4-hydroxyphenyl) 1,3,5-trisopropyl benzene.

13. The prepolymer of claim 1 wherein said tris-phenyl is tris(P-hydroxyphenyl) methane.

14. A metallic oxide polymer, said polymer comprising at least three crosslinked prepolymer moieties, each of said prepolymer moieties being the liquid prepolymer reaction product of a tris-phenyl having at least one hydrolyzable oxygen with a difunctional oxirane oligomer having at least one aromatic moiety and at least one oxirane containing aliphatic moiety and a metallic oxide having at least one hydrolyzable oxygen, said prepolymer being characterized in that substantially all of the hydrolyzable oxygen atoms in said tris-phenyl and said metallic oxide are bonded to said oligomer and, prior to polymerization of said prepolymer, there is substantially no bonding between oligomer moieties.

15. The polymer according to claim 14 wherein said oligomer is the diglycidyl ether of resorcinol.

16. The polymer of claim 14 wherein said oligomer is the diglycidyl ether of bisphenol A.

17. The polymer of claim 15 wherein said metallic oxide is silica.

18. The polymer of claim 16 wherein said metallic oxide is silica.

19. The polymer of claim 15 wherein said metallic oxide is aluminum oxide.

20. The polymer of claim 16 wherein said metallic oxide is aluminum oxide.

21. The polymer of claim 15 wherein said metallic oxide is magnesium oxide.

22. The prepolymer of claim 2 wherein said metallic oxide is a member selected from the group consisting of titanium oxide, antimony oxide, zinc oxide, iron oxide, and molybdenum oxide.

23. The prepolymer of claim 3 wherein said metallic oxide is a member selected from the group consisting of titanium oxide, antimony oxide, zinc oxide, iron oxide, and molybdenum oxide.

24. The polymer of claim 14 wherein said reaction is conducted in the presence of an imidazole catalyst.

25. The polymer of claim 14 wherein said tris-phenyl is tris (P-hydroxyphenyl) ethane.

26. The polymer of claim 14 wherein said tris-phenyl is tris (4-hydroxyphenyl) 1,3,5-trisopropyl benzene.

27. The polymer of claim 14 wherein said tris-phenyl is tris (P-hydroxyphenyl) methane.

* * * * *